May 23, 1939.  D. BEYER  2,159,246

METHOD OF MAKING TWIST BREAD

Filed April 20, 1938  2 Sheets-Sheet 1

INVENTOR.
DAVID BEYER
BY John H. Leonard
his ATTORNEY.

May 23, 1939.  D. BEYER  2,159,246
METHOD OF MAKING TWIST BREAD
Filed April 20, 1938  2 Sheets-Sheet 2

INVENTOR.
DAVID BEYER
BY John H. Leonard,
his ATTORNEY.

Patented May 23, 1939

2,159,246

UNITED STATES PATENT OFFICE 2,159,246

METHOD OF MAKING TWIST BREAD

David Beyer, Cleveland, Ohio

Application April 20, 1938, Serial No. 203,056

6 Claims. (Cl. 107—54)

This invention relates to a method and apparatus for making twisted bread, and, more particularly, to the preparation of the dough for the twisting operation.

Heretofore, in order to provide a better and more compact grain structure in the finished and baked loaf of bread, it has been found desirable to form the loaf of two separate pieces of dough which are twisted one upon another in helical form preparatory to the panning and baking operations and then to bake the loaves in the twisted condition. Due to the overlapping of the twisted pieces, the bread is prevented from being distended unduly and irregularly by occluded gases evolved during the baking operation, and, as a result, a more compact loaf having a fairly well defined grain structure and a more uniform consistency results.

In the present-day machine production of untwisted bread, the principal method used is to pass the dough through a so-called scaler or divider which weighs it out in pieces of the accurate weight for a full sized loaf and discharges the pieces onto a suitable conveyor. The conveyor discharges the pieces successively into a rounder wherein each piece is rolled into substantially spherical shape. Each piece of dough is discharged from the rounder into an overhead proofer, which carries it to a molder, the dough curing and rising to some extent as it passes through the proofer. Finally the pieces pass successively into the molder, wherein each piece first is rolled into a sheet through successive sets of rolls and the resultant sheet then is passed between reversely driven rolls which roll the sheet into a substantially cylindrical loaf. Each cylindrical loaf then is passed between a rotary drum and a cooperating compression plate which compresses the cylindrical loaf of dough so as to weld the convolutions together effectively and uniformly and thereby provide a substantial homogeneous mass. The loaf then is discharged from the molder and is ready for panning and baking. The machines above referred to are so correlated with relation to each other and with relation to the ovens that the production capacity is substantially equal to the oven capacity for full sized loaves of bread.

However, when it is desired to make twist bread, exactly the same machines and method are followed, except that the operations are performed on half-sized pieces of dough, two such half-sized pieces being combined to form a single full sized loaf. As a result, the capacity of the equipment, when the equipment is used for the production of twist bread, is reduced to one-half of the capacity possible when it is used for the production of untwisted bread. Further, the individual weighing of two half-sized pieces to make a full sized loaf of twist bread interposes a larger percentage of error in the final weight of the twist loaf. For example, assuming one-fourth of an ounce per piece is the permitted error of the weighing machine, this error might be repeated on each half-sized piece and might amount cumulatively to one-half ounce when two separate half-sized pieces are weighed separately and combined. Again, when two pieces are subjected to these operations and combined and twisted, they may not weld together as effectively as desired, due to the fact that there is too much flour interposed between the contacting surfaces.

The principal objects of the present invention are to overcome the disadvantages above described and to provide a new and improved method of making twist bread utilizing for the most part the existing equipment but without any reduction in the capacity of the equipment as compared to its capacity for producing ordinary untwisted bread.

Correlative objects are to assure better and more uniform welding of the pieces forming the twist loaf, to provide a twist loaf having a more tidy appearance, particularly at the ends, and to provide a more uniform texture and grain structure in twist loaf bread.

Another object is to provide a method adapted to be performed by machines and in which all of the operations immediately preceding the preparation of the dough mass for twisting of bread are the same as those heretofore practiced in connection with untwisted bread so that existing machines may be employed and made to produce twisted loaves at substantially the same capacity as untwisted loaves, the only special equipment required being a simple and inexpensive apparatus for operating on the loaf immediately preparatory to the twisting operation.

A more specific object is to produce a full sized loaf in the usual manner and then crease the loaf longitudinally for substantially its full depth to effect stretching of the skin layer without breaking the skin layer and then twisting the resultant portions together.

Other objects and advantages will become apparent from the following specification in which reference is made to the drawings, in which—

Heretofore attempts have been made to accomplish the objects above enumerated. For example, in United States Letters Patent No. 2,000,384, issued on May 7, 1935, to Charton C. Frantz, on a Method of making bread, there is disclosed the rolling of the loaf in the usual manner preparatory to the panning operation. According to the disclosure of said patent, the loaf was slit or cut for its full depth with a longitudinal slit which was said to extend the full length of the loaf or to terminate slightly short of the ends. The slit, in effect, divided the loaf into two pieces with freshly cut surfaces defining the slit. The pieces of the loaf were twisted with the freshly cut surfaces held together in helical formation, the twisting being done immediately after the slitting and before any non-adhering skin was formed on the freshly cut surfaces. In this way, the patentee sought to maintain the full capacity of the equipment while at the same time obtaining an effective weld between the two pieces forming the final twisted loaf of bread. This prior method has proven unsatisfactory in that the freshly cut surfaces tend to resume their original position immediately so that the resultant loaf is hardly dissimilar from an ordinary uncut loaf which is twisted about its longitudinal axis. Again, only by most careful handling by hand can the pieces be twisted properly because of the stickiness of the freshly cut raw edges, and thus the method is too slow for quantity production. The raw surfaces resulting from the cut render handling of the loaf by machinery practically impossible as the edges adhere readily to any surface which they contact. Apparently, the patentee foresaw that to coat these cut surfaces with flour or other ingredients to prevent their sticking would prevent an effective bond or weld between the pieces. If flour were placed on these freshly cut surfaces, then the amount of flour adhering to the surfaces would prevent welding of the surfaces together. Accordingly, there remained the problem of how to divide the single loaf into two portions which could be twisted together readily and which would weld together when so twisted.

Figure 1:
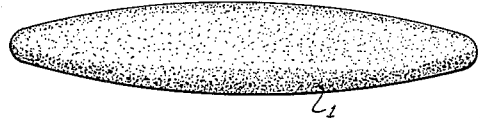
Figure 1 is a top plan view of a dough mass such as used in the manufacture of ordinary bread showing the mass ready for the panning operation.
Figure 2:
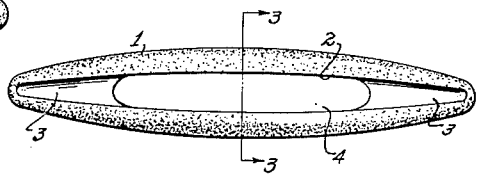
Figure 2 is a top plan view showing the dough mass of Figure 1 after the principal step of the present invention has been performed thereon.
Figure 3:
Figure 3 is a sectional view taken on a plane indicated by the line 3—3 in Figure 2.
Figure 4:
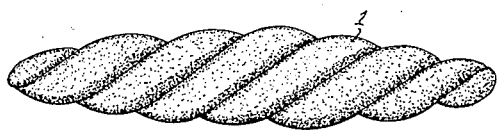
Figure 4 is a top plan view of the dough mass after the twisting operation.
Figure 5:
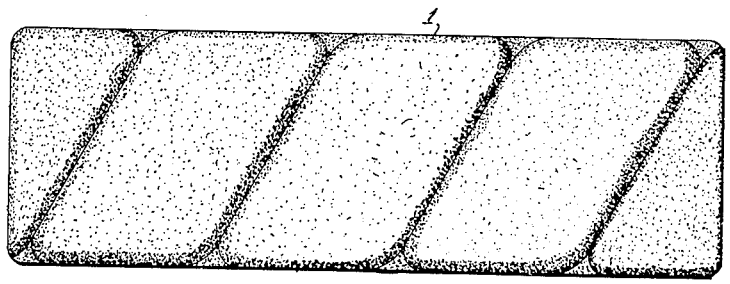
Figure 5 is a top plan view illustrating the finished loaf.

In accordance with the present invention, a mass of dough in the form of a full sized loaf 1 which is ready for panning is creased with a longitudinal crease 2. The crease 2 may extend full length of the loaf but preferably terminates just short of the ends. The creasing pressure is such that the crease extends substantially to the bottom of the loaf partway from the end portions toward the mid-portion, as illustrated in Figures 2 and 3, only a very thin skin 3 remaining between the pieces at the bottom near the ends. About the mid-portion of the loaf the crease extends entirely therethrough, as indicated at 4. The crease is relatively wide so that, in effect, the loaf is divided into two portions for the greater portion of its length, the end portions being connected by a slight bottom skin and the extreme ends being connected by the end portions of the original loaf. Though the crease extends entirely through the loaf at the mid-portion of the loaf, the separation of the portions at the mid-portion of the loaf is accomplished by a pinching action so that the skin is not broken and no raw edges are exposed. The loaf in this creased condition is then twisted about its longitudinal axis so as to dispose each portion in overlying nested relation with the other in a helical formation as illustrated in Figure 4, the surfaces defining the crease preferably being juxtaposed. The twisted loaf then is panned in the usual manner and baked, producing the final loaf of bread indicated in Figure 5.

Figure 6:
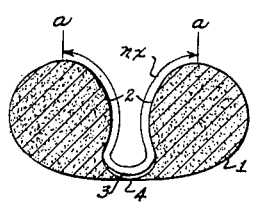
Figure 6 is an enlarged diagrammatic cross-sectional view of the creased loaf of dough.
Figure 7:
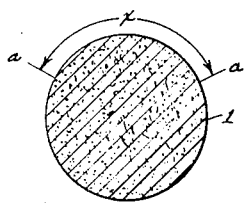
Figure 7 is an enlarged diagrammatic cross-sectional view of the loaf of dough before creasing.

Several advantages result from this creasing operation as compared with the cutting operation described in United States Letters Patent No. 2,000,384, identified supra. Referring to Figures 6 and 7, let it be assumed that a circumferential surface area of the uncreased loaf of dough between certain limits $a$—$a$, is covered by the right quantity of flour to prevent sticking, this area being designated at $x$ in Figure 7. During the creasing operation of the loaf, the crease is effected without breaking through the surface skin of the loaf. As a result, the area $x$ between the limits $a$—$a$ is stretched so as to equal a total of $nx$, as indicated in Figure 6. In other words, the skin and its flour covering is distributed over a much larger area so that the amount of flour or thickness of the skin on any given surface area defining the crease is proportionately reduced during creasing but the skin of the loaf is not broken. When the two portions of the loaf are twisted together, the amount of flour and skin between any overlapping stretched surface portions $nx$ is equal to or less than the amount of flour on a given unit surface area of the original loaf. More specifically, the combined thickness of the skin and flour at the subsequently lapped portions $nx$ is equal to or less than the thickness of the skin and flour at the original portion $x$. Thus no raw edges are exposed and the two portions of the loaf may be handled readily and twisted as desired. Even if surface areas $nx$ should lie against uncreased surface portions of the original loaf, the combined skin and flour coating are so slight that the surfaces will weld to the amount desired. Thus, the portions of the loaf may be handled as though they were separately formed and at the same time the amount of flour between the surfaces is reduced and proper welding of all contacting surfaces occurs when the loaf is twisted. If the cutting operation of the above patent were followed and flour was then placed on the cutting edges, obviously there would be a proportional increase in the flour and the thickness of this coating and skin on the cut edges would become as thick as that on the remainder of the loaf. Therefore, when such surfaces were placed together or against other surfaces, the flour and skin would be twice the thickness of that on the rest of the loaf and the two portions would not weld. It is apparent, therefore, that by creasing the loaf without breaking the skin and then twisting the portions separated by the crease into a twist loaf, a very practical and efficient method is provided.

Figure 8:
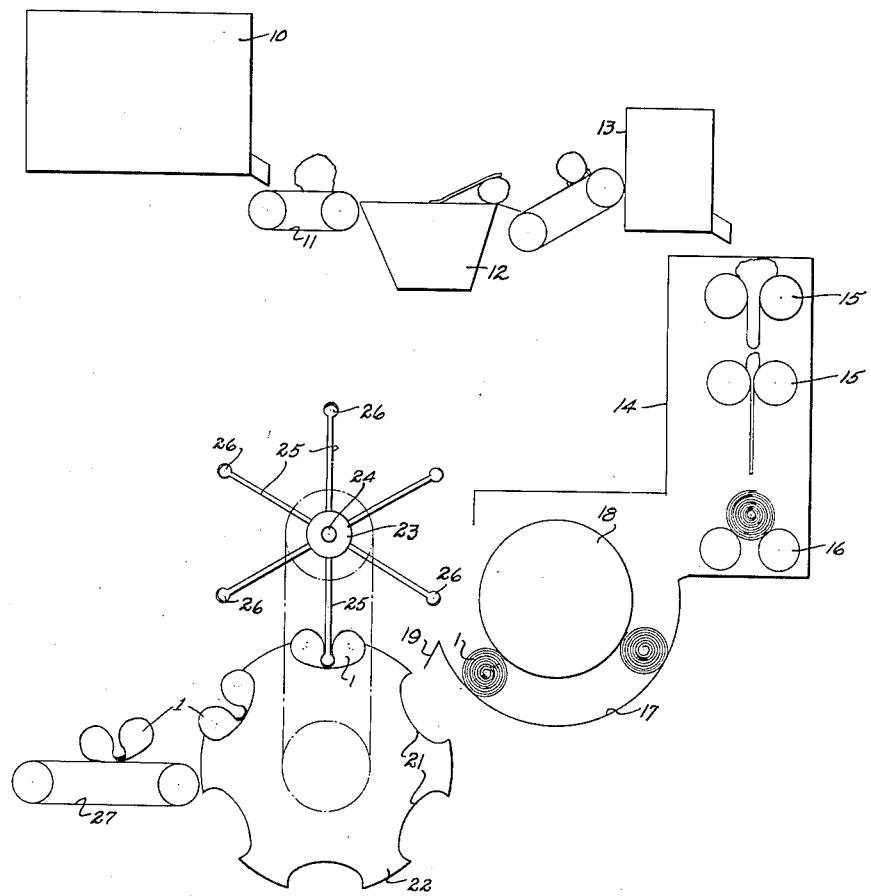
Figure 8 is a diagrammatic illustration of the apparatus for performing the method of the present invention.

Referring next to Figure 8, the manufacture of bread is generally performed by passing the dough initially into a scaler or divider 10 from which it passes onto a belt or other suitable conveyor 11 and is carried into a rounder 12, wherein the dough is rounded into spherical form. The balls of dough then pass from the rounder onto a suitable conveyor and overhead proofer 13 from which they are discharged into a molder 14. In this apparatus the ball of dough passes through a series of rollers such as indicated generally at 15 in which it is pressed into sheets and discharged into suitable rollers 16 which roll the sheets into cylindrical rolls. The sheets are discharged from the roller 16 and pass between a pressure plate 17 and a rotatable drum 18 which compresses the rolls and effectively welds the convolutions, discharging the dough as a rolled loaf 1. This equipment is that which is generally provided in the present-day bakeries and ordinarily the rolled loaf is taken from the molder and panned and baked, or, if twist loaves are to be made, two separate half-sized pieces from the molder are twisted together. In addition to this apparatus, in accordance with the present invention, the rolled loaves 1 are discharged by the molder onto a suitable platform 19 from which they roll into pockets 21 on a rotatable drum 22. Driven in timed relation to the drum 22 is a creaser 23 comprising a rotatable shaft 24 having a series of creasing elements or paddles 25 thereon. The rotation of the drum 23 and the shaft 24 is so timed that as the drum rotates, the loaves in the respective pockets are engaged respectively by the elements or paddles 25 and creased as illustrated in Figures 3 and 8. The creasing elements or paddles are preferably very dull and enlarged and blunt on the end, as indicated at 26, the outer ends preferably being in the form of cylinders. The elements or paddles engage the dough with a rolling motion so as to make a very wide crease which is gradually decrescent in width toward the bottom, the bottom of each crease being substantially the width of the blunt end 26 of a creasing element or paddle 25. The creasing elements or paddles are of slightly greater dimension radially at their mid-portions so as to mash or pinch the loaf of dough completely through along the longitudinal mid-portion of the loaf, as illustrated in Figure 2. Upon continued revolution of the drum 22 the loaves thus creased are discharged onto a suitable conveyor 27 from which they are lifted by the operator and twisted, or, if desired, they may pass into a suitable twisting machine. By this method, twist bread may be manufactured by the customary equipment at the same capacity as for untwisted bread. Furthermore, the amount of flour and skin between the convolutions of the parts forming the twist loaf is so reduced that a better weld therebetween is provided than in the case wherein the two pieces are separately formed as in the prior practice. Again, since no raw edges are caused by the creasing operation, the two portions can be handled readily and twisted without adhering to the operator's hands or to the equipment.

If desired, the loaf may be creased for its full length and entirely to the bottom so as to form two entirely separate half loaf portions and these portions may then be twisted the same as heretofore described. The creasing in this has a disadvantage, however, in that the ends and end portions of the loaf after baking are not as neat in appearance as the loaves produced from portions connected at the ends and by the bottom skin. However, due to the creasing action, the pieces are pinched apart so that the raw edges are sealed over and are not exposed, the skin being, in effect, unbroken even by this extreme creasing action.

Having thus described my invention, I claim:

1. A method of preparing dough for making twist loaves of bread comprising the steps of forming a single mass of dough into form for a loaf of bread of the same weight as desired for the twisted loaf, creasing the mass longitudinally without breaking through the skin thereof, and then twisting the resultant portions of the dough mass about each other into a helical formation.

2. A method of preparing dough for making twist loaves of bread, comprising the steps of forming a single mass of dough into a shape for an elongated, full-sized loaf of bread, creasing the mass longitudinally at a portion between the ends of the mass without breaking through the skin thereof, and then twisting the resultant portions of the dough mass about each other into a helical formation.

3. A method of preparing dough for making twist loaves of bread, comprising the steps of forming a single mass of dough into a shape for a single elongated full-size loaf of bread, creasing the mass longitudinally at a portion between the ends of the mass substantially to the bottom of the mass without breaking through the skin thereof, and then twisting the resultant portions of the dough mass about each other into a helical formation.

4. A method of preparing dough for making twist loaves of bread, comprising the steps of forming a mass of dough into an elongated, generally cylindrical mass, forming in the mass a longitudinal crease which extends entirely to the bottom of the mass at the longitudinal mid-portion of the mass and substantially to the bottom of the mass at each end of and adjacent to said midportion without breaking through the skin of the mass, and then twisting the resultant portions of the mass about each other into helical formation.

5. A method of preparing dough for making twist loaves of bread, comprising the steps of forming a mass of dough into an elongated, essentially cylindrical mass, creasing the mass longitudinally entirely to the bottom of the mass while preserving a skin on the mass at the creased portion, and thereby forming the mass into separated portions, and then twisting the resultant portions of the mass about each other into helical formation.

6. A method of preparing dough for making twist loaves of bread, comprising the steps of passing the dough continuously along a predetermined path, forming the dough into separate, elongated, generally cylindrical masses, creasing the masses successively longitudinally while preserving a skin on the masses at the creased portions, and then twisting the resultant portions of each mass, successively, about each other into helical formation, all while the masses are continuously moving along said path.

DAVID BEYER.